US011333436B2

(12) United States Patent
Hamada et al.

(10) Patent No.: US 11,333,436 B2
(45) Date of Patent: May 17, 2022

(54) HEAT EXCHANGER

(71) Applicant: DENSO CORPORATION, Kariya (JP)

(72) Inventors: Hiroshi Hamada, Kariya (JP);
Tomohiko Nakamura, Kariya (JP);
Yuta Matsuda, Kariya (JP)

(73) Assignee: DENSO CORPORATION, Kariya (JP)

(*) Notice: Subject to any disclaimer, the term of this patent is extended or adjusted under 35 U.S.C. 154(b) by 24 days.

(21) Appl. No.: 16/930,149

(22) Filed: Jul. 15, 2020

(65) Prior Publication Data

US 2020/0348084 A1 Nov. 5, 2020

Related U.S. Application Data

(63) Continuation of application No. PCT/JP2018/045262, filed on Dec. 10, 2018.

(30) Foreign Application Priority Data

Jan. 19, 2018 (JP) .............................. JP2018-007093
Aug. 29, 2018 (JP) .............................. JP2018-160828

(51) Int. Cl.
*F28F 9/02* (2006.01)
*F28D 1/053* (2006.01)
*F28F 1/32* (2006.01)

(52) U.S. Cl.
CPC ................ *F28D 1/053* (2013.01); *F28F 1/32* (2013.01)

(58) Field of Classification Search
CPC .................................... F28D 1/053; F28F 1/32

USPC ........................................................ 165/175
See application file for complete search history.

(56) References Cited

U.S. PATENT DOCUMENTS

| 4,716,959 | A | * | 1/1988 | Aoki | ........................ | B23K 1/19 |
| | | | | | | 165/152 |
| 5,865,243 | A | | 2/1999 | Kato et al. | | |
| 6,964,296 | B2 | * | 11/2005 | Memory | .............. | B23K 1/0012 |
| | | | | | | 165/151 |
| 7,438,121 | B2 | * | 10/2008 | Minami | .................. | C23C 22/34 |
| | | | | | | 165/133 |
| 2005/0067142 | A1 | | 3/2005 | Yoon et al. | | |
| 2010/0270013 | A1 | * | 10/2010 | Lee | ........................ | F28D 1/0477 |
| | | | | | | 165/182 |

FOREIGN PATENT DOCUMENTS

| DE | 69809121 T2 | 7/2003 |
| JP | H06123571 A | 5/1994 |
| JP | H10318695 A | 12/1998 |
| JP | 2000-141028 A | 5/2000 |
| JP | 2002103027 A | 4/2002 |
| JP | 2002181480 A | 6/2002 |
| JP | 2002277187 A | 9/2002 |

(Continued)

*Primary Examiner* — Davis D Hwu
(74) *Attorney, Agent, or Firm* — Harness, Dickey & Pierce, P.L.C.

(57) ABSTRACT

A heat exchanger is configured to exchange heat between a heat medium and an air. The heat exchanger includes a tube through which the heat medium flows therein, and a fin that is formed by bending a metal plate and that is brazed to a surface of the tube. The fin includes a louver. The surface of the tube defines an introducing groove configured to introduce a brazing material melted at brazing from a connecting portion between the tube and the fin to an other portion.

9 Claims, 9 Drawing Sheets

(56) References Cited

FOREIGN PATENT DOCUMENTS

| | | |
|---|---|---|
| JP | 2004263938 A | 9/2004 |
| JP | 2006010304 A | 1/2006 |
| JP | 2010197002 A | 9/2010 |
| JP | 2015116684 A | 6/2015 |

\* cited by examiner (A)

(B)

(C)

(A)

(B)

HEAT EXCHANGER

CROSS REFERENCE TO RELATED APPLICATION

The present application is a continuation application of International Patent Application No. PCT/JP2018/045262 filed on Dec. 10, 2018, which designated the U.S. and claims the benefit of priority from Japanese Patent Application No. 2018-007093 filed on Jan. 19, 2018, and Japanese Patent Application No. 2018-160828 filed on Aug. 29, 2018. The entire disclosures of all of the above applications are incorporated herein by reference.

TECHNICAL FIELD

The present disclosure relates to a heat exchanger configured to exchange heat between a heat medium and an air.

BACKGROUND ART

A heat exchanger configured to exchange heat between a heat medium and an air may be a radiator to decrease a temperature of a cooling water having been heated through an internal combustion engine or an evaporator to evaporate a refrigerant in a refrigerant cycle. The heat exchanger includes tubes each having a tube shape through which a heat medium such as a cooling water flows and fins each formed by bending a metal plate. The tubes and the fins are stacked with each other to configure the heat exchanger.

SUMMARY

A heat exchanger is configured to exchange heat between a heat medium and an air. The heat exchanger includes a tube having a tube shape through which the heat medium flows therein and a fin formed by bending a metal plate. The fin is brazed to a surface of the tube. The fin includes a louver. The surface of the tube defines an introducing groove to introduce a brazing material melted in brazing from a connecting portion between the tube and the fin to other portions.

DETAILED DESCRIPTION

Figure 1:
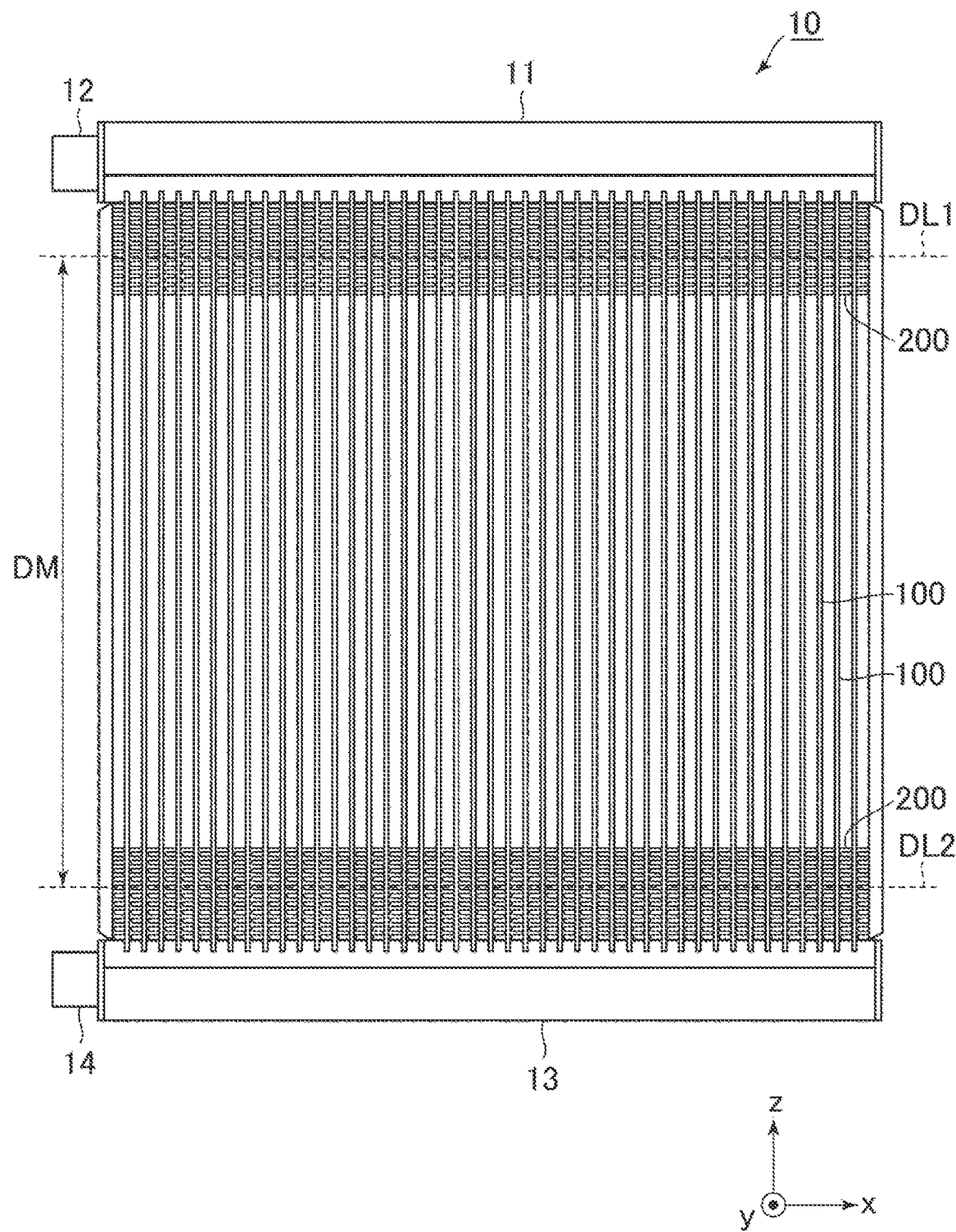
FIG. 1 is a general view of a heat exchanger in a first embodiment.

To begin with, examples of relevant techniques will be described.

A heat exchanger configured to exchange heat between a heat medium and an air may be a radiator to decrease a temperature of a cooling water having been heated through an internal combustion engine or an evaporator to evaporate a refrigerant in a refrigerant cycle. The heat exchanger includes tubes each having a tube shape through which a heat medium such as a cooling water flows and fins each formed by bending a metal plate. The tubes and the fins are stacked with each other to configure the heat exchanger.

The tubes and the fins adjacent each other are brazed with a brazing material. At least either one of the tube and the fin is often formed with a plate member overlaid with the brazing material on its surface in advance to perform a connection of the tubes and the fins easily. Such plate member is referred as a "clad material". When multiple tubes and fins are stacked and the stacked tubes and fins as a whole are heated, the brazing material disposed on the surface of the tubes or the fins melts and both of the tubes and fins get wet with the brazing material. After the heating has been completed and the brazing material is solidified again, the multiple tubes and fins are connected with the brazing material to be integrated.

The fin often includes multiple louvers formed by cutting and raising a part of the fin. For an efficient heat exchange between the fins and the air, it is preferable to have the louvers as wide as possible in an area of the fins. Specifically, it is preferable that ends of the louvers extend as close toward a connecting portion between the fins and the tubes as possible.

The melting brazing material is gathered near the connecting portion between the fins and the tubes to form a fillet. When the ends of the louvers are located too close to the connecting portion, the louvers may be in contact with the fillet. If the louvers contact with the fillet at the brazing, the melting material may be drawn up through a space between the louvers due to a surface tension. As a result, a malfunction such that a part of the fins melts may be occur.

To prevent such malfunction, a layer of the brazing material overlaid on the surface of the tubes or the fins may be thinner to reduce an amount of the brazing material. However, in this case, an enough amount of the brazing material required for connecting members may not be secured, which increases a possibility such that a connecting malfunction occurs at some portions.

It is objective of the present disclosure to provide a heat exchanger that can restrict a brazing material from contacting with a louver of a fin while securing an enough amount of a brazing material required for brazing.

A heat exchanger is configured to exchange heat between a heat medium and an air. The heat exchanger includes a tube having a tube shape through which the heat medium flows therein and a fin formed by bending a metal plate. The fin is brazed to a surface of the tube. The fin includes a louver. The surface of the tube defines an introducing groove to introduce a brazing material melted in brazing from a connecting portion between the tube and the fin to other portions.

In the heat exchanger having such configuration, a part of the brazing material melted in brazing moves along the introducing groove due to a surface tension. Specifically, a part of the melting brazing material is introduced from the connecting portion between the tube and the fin to other portions. Thus, an amount of the brazing material remained at the connecting portion between the tube and the fin is reduced, thereby downsizing the fillet formed at the connecting portion.

Accordingly, when the end of the louver is located closer to the connecting portion between the tube and the fin than before, the louver is not in contact with the fillet and a malfunction such that a part of the fin melts does not occur. Additionally, it is needless to reduce a thickness of a layer of the brazing material overlaid on the surface of the tube or the fin, thereby securing an enough amount of the brazing material required for connecting members.

The present disclosure provides a heat exchanger that can restrict the brazing material from contacting with the louver of the fin while securing an enough amount of the brazing material required for brazing.

Hereinafter, embodiments will be described with reference to the drawings. Same or equivalent portions among the drawings are labeled with the same reference numerals as well as possible and redundant explanations will be omitted for descriptive purposes.

A heat exchanger 10 according to this embodiment is configured as an evaporator forming a part of a refrigerant cycle (not shown) that is an air conditioning system of a vehicle. A compressor (not shown) disposed at the refrigerant cycle feeds a refrigerant that is a heat medium to the heat exchanger 10. The heat exchanger 10 exchanges heat between the refrigerant fed into the heat exchanger 10 and an air by evaporating the refrigerant therein to cool the air.

The heat exchanger 10 may be a heat exchanger other than the evaporator. For example, the heat exchanger 10 may be a radiator for cooling a cooling water having passed through an internal combustion engine by a heat exchange between the cooling water and an air. In this case, the cooling water corresponds to the heat medium.

A configuration of the heat exchanger 10 will be described with reference to FIG. 1. The heat exchanger 10 includes an upper tank 11, a lower tank 13, tubes 100, and fins 200.

The upper tank 11 is a container for reserving the refrigerant supplied to the heat exchanger 10 and providing the refrigerant to respective tubes 100. The upper tank 11 has a long and narrow stick shape. The upper tank 11 is located at an upper side of the heat exchanger 10 such that a longitudinal direction of the upper tank 11 is arranged along a horizontal direction.

An end of the upper tank 11 in the longitudinal direction includes a supplying portion 12 through which the refrigerant supplied from outside into the upper tank 11. A pipe (not shown) for supplying the refrigerant to the heat exchanger 10 is connected to the supplying portion 12. The pipe fluidly connects the heat exchanger 10 and an expansion valve located at a position upstream side of the refrigerant cycle.

The lower tank 13 is a container having a substantially same shape with the upper tank 11. The lower tank 13 receives the refrigerant flowing out of the upper tank 11 through the tubes 100. The lower tank 13 is located at a lower side of the heat exchanger 10 such that a longitudinal direction of the lower tank 13 is arranged along the horizontal direction.

An end of the lower tank 13 in the longitudinal direction includes a discharging portion 14 through which the refrigerant having been heat-exchanged at the heat exchanger 10 flows out of the lower tank 13. A pipe (not shown) for discharging the refrigerant from the heat exchanger 10 is connected to the discharging portion 14. The pipe fluidly connects the heat exchanger 10 and a compressor located at a position downstream side of the refrigerant cycle.

In FIG. 1, a direction along the longitudinal direction of the upper tank 11 from a left to a right side in FIG. 1 is a x direction and an axis along the x direction is a x axis. A direction in which an air passes through the heat exchanger 10 from a far side to a front side in FIG. 1 is a y direction and an axis along the y direction is a y axis. A direction from the lower tank 13 to the upper tank 11 is a z direction and an axis along the z direction is a z axis. In the following figures, the x, y, and z axes are set in the same manner.

The heat exchanger 10 includes multiple tubes 100. Each of the tubes 100 has a long and narrow tube shape having a flat shaped cross section. The tube 100 defines a passage FP therein through which the refrigerant flows in the longitudinal direction. The tubes 100 are layered such that a longitudinal direction of the tube 100 is along a vertical direction and main surfaces of the tubes 100 are facing with each other. A direction in which the multiple tubes 100 are layered is the same as the longitudinal direction of the upper tank 11, i.e., the x direction.

An end of each tube 100 is connected to the upper tank 11 and the other end of the each tube 100 is connected to the lower tank 13. According to this configuration, an inner space of the upper tank 11 and an inner space of the lower tank 13 are in communication through the passage FP of the tubes 100.

The refrigerant flows from the upper tank 11 to the lower tank 13 through the tubes 100 (i.e., through the passage FP). At this time, the refrigerant exchanges heat with air flowing around the tubes 100 to be converted from a liquid-phase to a gas-phase. The air is deprived of heat through the heat exchange with the refrigerant and decreases its temperature.

In a configuration in which the inner space of the upper tank 11 and the inner space of the lower tank 13 are divided into multiple portions with partitions, the refrigerant may flow back and forth between the upper tank 11 and the lower tank 13.

Figure 2:
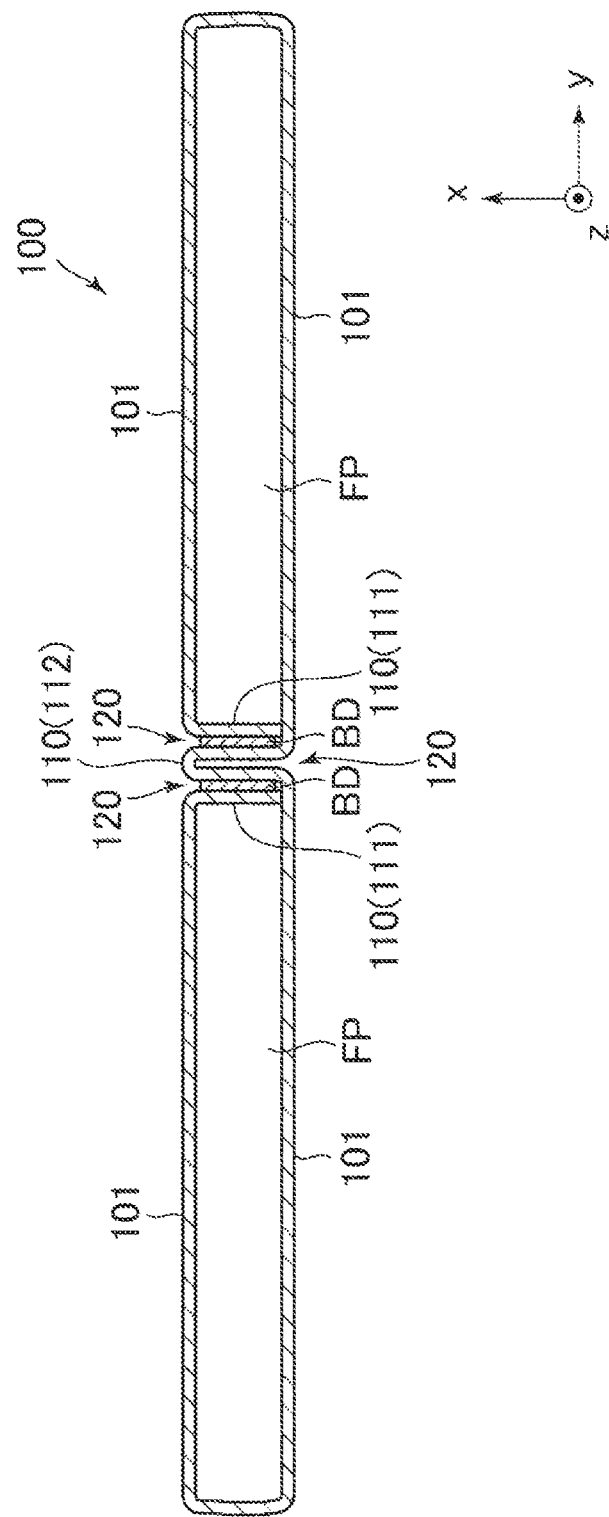
FIG. 2 is a cross-sectional view of a tube.

FIG. 2 is a cross-sectional view of the tube 100 taken along a longitudinal direction of the tube 100, i.e., along a surface perpendicular to the z axis. As shown in FIG. 2, the tube 100 is formed such that one metal plate is bent into a tube shape and a part of a surface of the metal plate is overlapped with each other and brazed.

Surfaces of the tube 100 perpendicular to the x axis are surfaces to be brazed with the fins 200 and substantially flat. The surfaces are referred as "flat surfaces 101". A normal line direction of the flat surfaces 101 is along the x axis.

The flat surface 101 at a left side of the tube 100 in FIG. 1 (i.e., −x side of the tube 100) includes a protrusion 112 protruding in the x direction. The protrusion 112 is located at a center part of the flat surface 101 in the y direction. A position of a tip end of the protrusion 112 is substantially the same as a position of the flat surface 101 at a right side of the tube 100 in FIG. 2 (i.e., +x side of the tube 100) in the x direction.

The flat surface 101 at the +x side of the tube 100 includes bending portions 111. The bending portions 111 are formed such that ends of the metal plate adjacent to the protrusion 112 are bent inward to the flat surface 101 at the −x side of the tube 100 and extends in the x direction. The bending portions 111 are brazed to the protrusion 112 with a brazing material BD. The bending portions 111 are the ends of the metal plate forming the tube 100.

The metal plate forming the tube 100 is a clad material having a brazing metal layer entirely on its surface. Thus, entire surface of the tube 100 exposed to the outside is overlaid with the brazing material BD, but only a part of the brazing material BD is depicted in FIG. 2.

The bending portions 111 and the protrusion 112 are made by bending a part of the metal plate. The bending portions 111 and the protrusion 112 are joined with each other to form a rib 110. The rib 110 is an inner pillar connecting the flat surface 101 at the +x side of the tube 100 and the flat surface 101 at the −x side of the tube 100 to secure a rigidity of the tube 100.

At a root part of the rib 110 on the surface of the tube 100, a recess 120 is formed by bending the metal plate inward. The recess 120 is recessed inward from the surface of the tube 100 and extends in the z direction.

With reference to FIG. 1 again, each of the fins 200 is made by bending a metal plate into a wave shape and disposed between the adjacent tubes 100. Top peaks of the fins 200 having the wave shape are in contact with and brazed to the flat surfaces 101 of the tubes 100. Thus, a heat of air passing through the heat exchanger 10 is transferred to the refrigerant not only through the tubes 100 but also through the fins 200. That is, the fins 200 increases a contact area with the air to improve an efficiency of the heat exchange between the refrigerant and the air.

In this embodiment, the tubes 100 are made of clad material as described above. Thus, the brazing material BD overlaid on the surface of the tubes 100 connects the tubes 100 and the fins 200. Alternatively, not the tubes 100 but the fins 200 may be made of clad material.

The fins 200 are disposed in an entire space between the two tubes 100 adjacent each other. That is, the fins 200 are disposed in an entire range between the upper tank 11 and the lower tank 13. In FIG. 1, a part of the fins 200 are depicted and illustration of other parts of the fines 200 are omitted.

Figure 3:
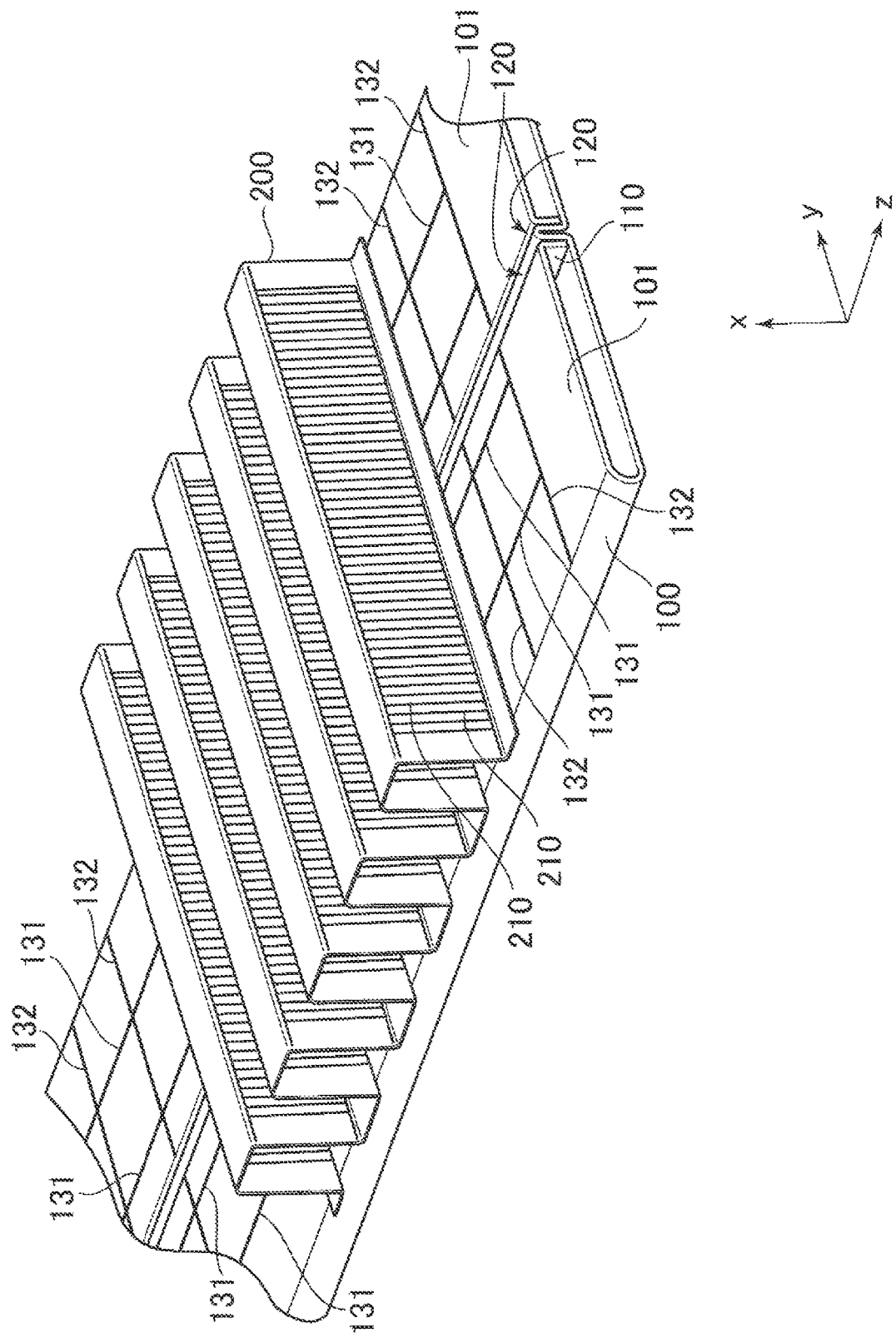
FIG. 3 is a perspective view of a fin connected to the tube.

FIG. 3 is a perspective view of the fin 200 connected to the tube 100. In FIG. 3, a part of the fin 200 is illustrated. As shown in FIG. 3, the fin 200 includes multiple louvers 210 at a position of the fin 200 extending in the x direction. The lovers 210 are made by cutting and raising a part of the fin 200.

Specifically, multiple straight slits are formed at the fin 200 to be arranged in the y direction and strip portions formed by the slits are rotated around an axis along a longitudinal direction of the strip portions to form the louvers 210. The louvers 210 enable an efficient heat exchange with the air passing through the louvers 210. A configuration of the louvers 210 may be a conventionally known configuration, thus a detail description of the shape of the louvers 210 is omitted.

Figure 4:
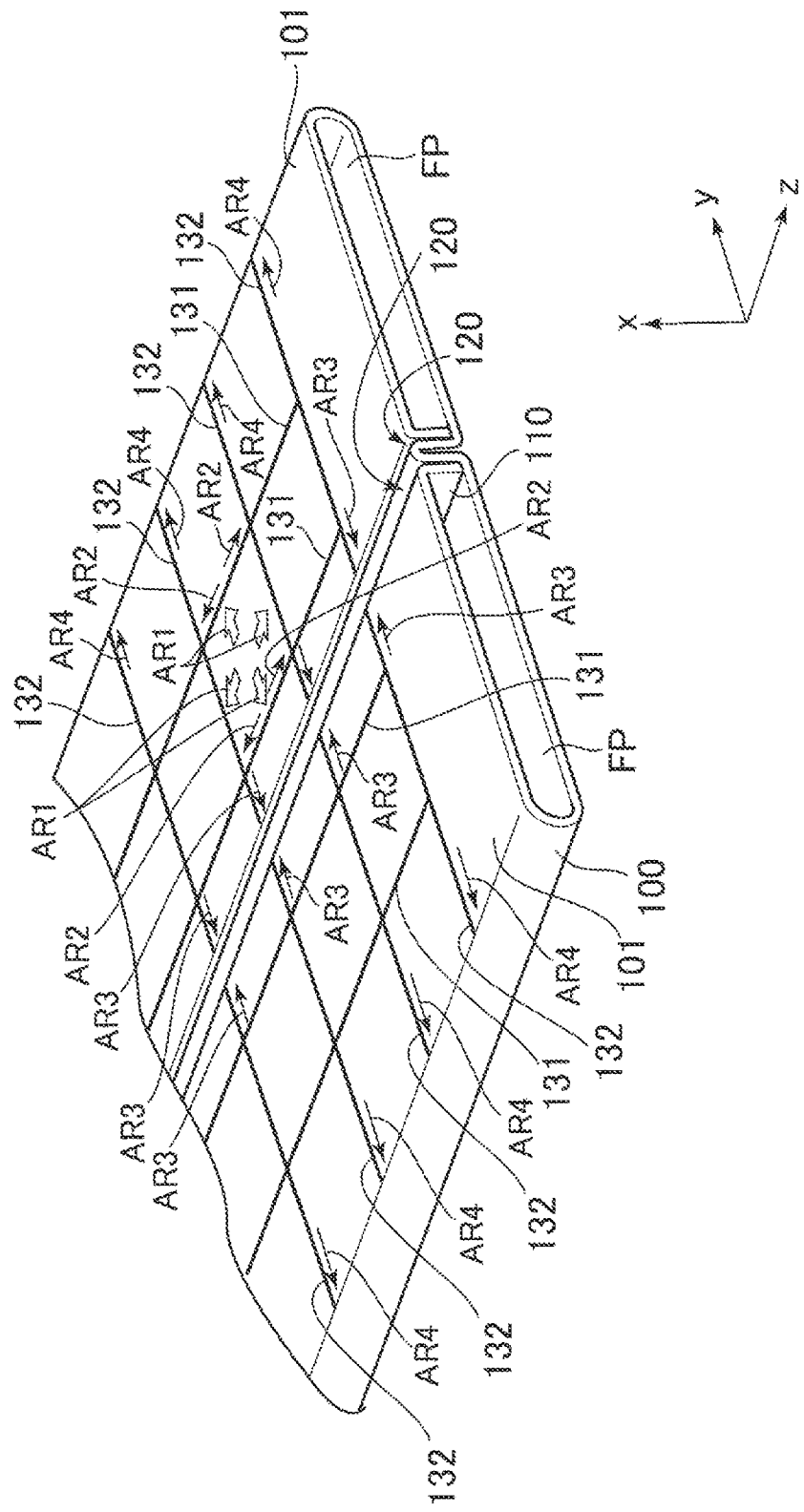
FIG. 4 is a schematic view of the tube illustrating locations of introducing grooves on a surface of the tube.

With reference to FIG. 4, a configuration of the tube 100 will be further described. FIG. 4 is a partial perspective view of the tube 100 at an end of the tube 100 in the z direction. As shown in FIG. 4, the flat surface 101 of the tube 100 includes introducing grooves 131 and 132. FIG. 4 shows only the flat surface 101 at the +x side of the tube 100, but the flat surface 101 at the −x side of the tube 100 also includes the introducing grooves 131 and 132. Positions of the introducing grooves 131 and 132 are the same between the flat surfaces 101, thus only the introducing grooves 131 and 132 on the flat surface 101 at the +x side of the tube 100 will be described.

The introducing grooves 131 extend straight in the z direction and are arranged in the y direction. Each of the introducing grooves 131 does not extend to the ends of the tube 100 in the longitudinal direction of the tube 100. The introducing grooves 131 only extend in a range between a dot line DL 1 and a dot line DL 2 in FIG. 1. Thus, the introducing grooves 131 are not connected to connecting portions between the tubes 100 and the upper tank 11 nor connecting portions between the tubes 100 and the lower tank 13.

Each of the introducing grooves 131 extends entirely in a range DM in FIG. 1. Thus, the introducing grooves 131 are connected to many of connecting portions between the tubes 100 and the fins 200.

The introducing grooves 132 extend straight in the y direction and arranged in the z direction. Each of the introducing grooves 132 extends entirely on the flat surface 101. Thus, ends of the introducing grooves 132 are in communication with the recess 120. The introducing grooves 132 are located in the range DM between the dot line DL 1 and the dot line DL 2 in FIG. 1 as with the introducing grooves 131. The introducing grooves 131 and the introducing grooves 132 cross with each other in the range DM.

Figure 5:
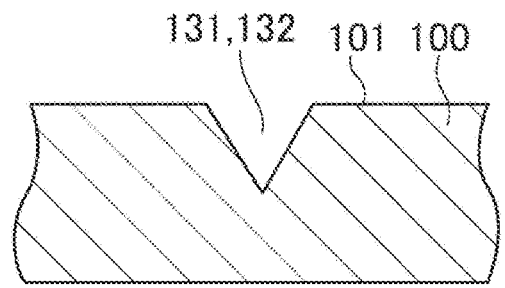
FIG. 5 is a schematic view illustrating cross sections of the introducing grooves.
Figure 5:
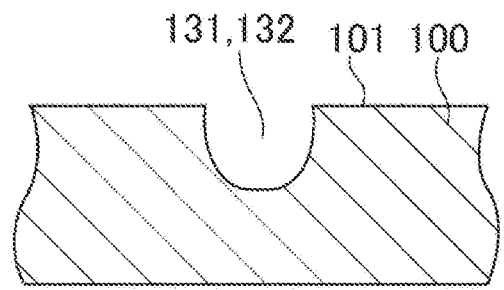
Figure 5:
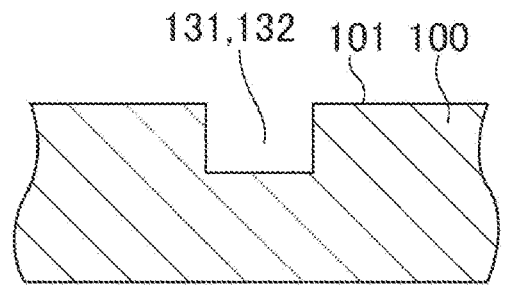

FIG. 5 is cross sectional views of the introducing grooves 131 and 132 cut along a surface perpendicular to the longitudinal direction of the introducing grooves 131 and 132. In this embodiment, the cross section of each of the introducing grooves 131 and the introducing grooves 132 has a V-shape shown in FIG. 5 (A). Alternatively, the cross section of the introducing groove 131, 132 may have a circular arc shape shown in FIG. 5 (B) or a rectangular shape shown in FIG. 5 (C).

Figure 6:
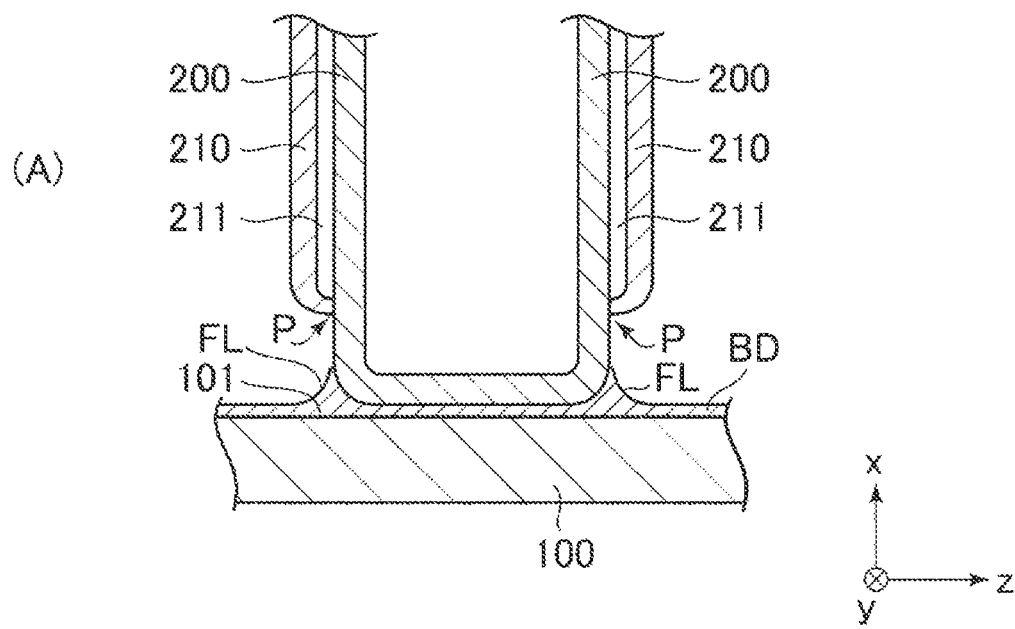
FIG. 6 is a schematic view illustrating an advantage of the introducing grooves.
Figure 6:
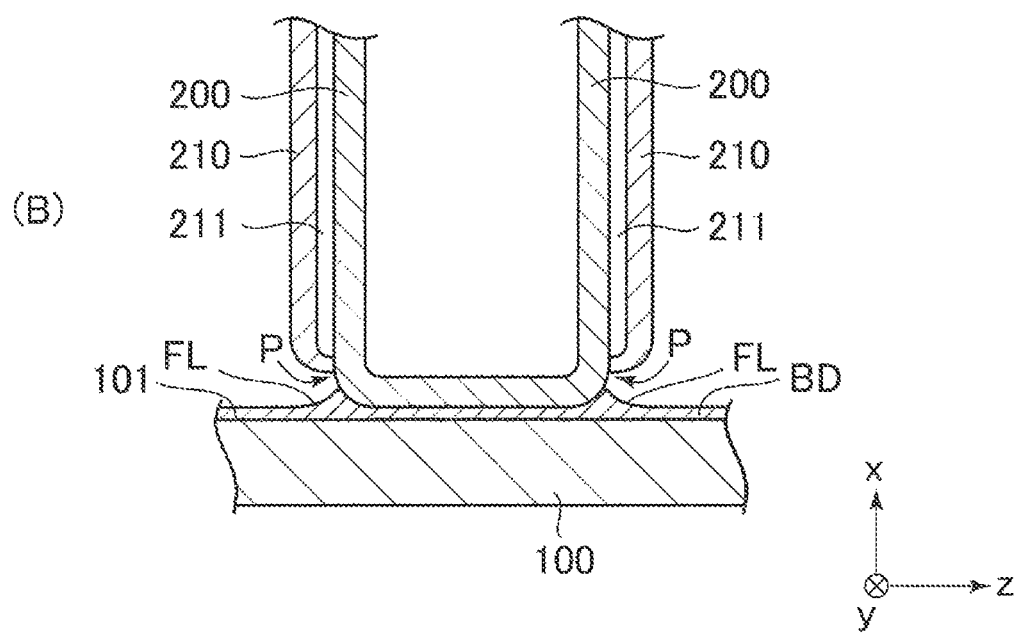

Advantages of the introducing grooves 131 and 132 of the tube 100 will be described. FIG. 6 is a cross-sectional view of the connecting portion between the tube 100 and the fin 200 taken along a surface perpendicular to the y axis. FIG. 6 (A) is a cross section in which the tube 100 does not include the introducing grooves 131 and 132 and a FIG. 6 (B) is a cross section in which the tube 100 includes the introducing grooves 131 and 132 (i.e., in this embodiment).

At the connecting portion between the tube 100 and the fin 200, the brazing material BD melted at brazing gathers due to a surface tension to form a fillet FL. A height of the brazing material BD at the fillet FL is higher than other portions.

When the fillet FL contacts with the louvers 210 in brazing, melting brazing material BD may be drawn up through a space 211 between the louvers 210. In this case, the brazing material BD fills almost the entire space 211, which causes the louvers 210 to lose their function. Furthermore, a part of the fin 200 may be possibly melt.

In the configuration without the introducing grooves 131, 132, an end P of the louvers 210 facing the connecting portion between the tube 100 and the fin 200 needs to be distanced further from the tube 100 not to contact with the fillet FL. In other words, a length of an area in which the louvers 210 are located needs to be short.

However, it is preferable that the length of the area of the louvers 210 is as long as possible to improve heat exchange performance. To prevent the fillet FL from contacting with the louvers 210 while keeping the length of the area of the louvers 210 long, the brazing material layer overlaid on the surface of the tube 100 may be thinner to reduce an amount of the brazing material BD. However, in this case, it is difficult to secure an enough amount of the brazing material BD for joining members and a joining malfunction at a part may be increased. The part is, for example, a connecting portion between the tube 100 and the upper tank 11.

The tube 100 in this embodiment includes the introducing grooves 131 and 132 on its surface, so that the height of the fillet FL is reduced to solve above mentioned subjects. This will be described with reference to FIG. 4.

The brazing material BD melting at brazing extends on the flat surface 101 along arrows AR 1 in FIG. 4 and a part of the brazing material BD flows into the introducing grooves 131 and 132. The brazing material BD is guided along the introducing grooves 131 and 132 due to a surface tension. In FIG. 4, a flow of the brazing material BD guided by the introducing grooves 131 is shown in arrows AR2. A flow of the brazing material BD guided by the introducing grooves 132 is shown by arrows AR3 and AR4.

In brazing, the brazing material BD at the connecting portion between the tube 100 and the fin 200 is guided from the connecting portion to other portions along the introducing grooves 131. The other portion is, for example, the recess 120. As a result, as shown in FIG. 6 (B), the fillet FL located at the connecting portion between the tube 100 and the fin 200 in the heat exchanger 10 of this embodiment is smaller than that in the heat exchanger without the introducing grooves 131, 132.

In this embodiment, the end P of the louvers 210 facing the connecting portion is closer to the tube 100 than that in the heat exchanger without the introducing grooves 131, 132. In other words, the length of the area of the louvers 210 is longer than before. As a result, a heat exchange performance is improved. In such configuration, the fillet FL in this embodiment is small, so that the fillet FL is restricted from contacting with the louvers 210. In addition, it is no need to reduce the thickness of the brazing material layer overlaid on the surface of the tube 100, thus the enough amount of the brazing material for joining parts is secured.

As described above, in the heat exchanger 10 of this embodiment includes the introducing grooves 131 and 132 to guide the brazing material BD melted at brazing from the connecting portion to other portions at the surface of the tube 100. Specifically, the surface is the flat surface 101. Accordingly, the brazing material BD is restricted from contacting with the louvers 210 of the fin 200 while the enough amount of the brazing material BD is secured.

The introducing grooves 132 are connected to the recess 120 located on the surface of the tube 100. Thus, a part of the brazing material BD melted at the brazing is guided and supplied to the recess 120 along the arrows AR2 in FIG. 4 through the introducing grooves 131 and 132. As a result, most of the recess 120 is filled with the brazing material BD.

The upper tank 11 includes multiple through holes (not shown) through which the tubes 100 are inserted. The tubes 100 are inserted into the through holes and brazed to the upper tank 11. Thus, if the recess 120 is relatively large, the inner space of the upper tank 11 may be in communication with an outer space through the recess 120, which causes the refrigerant to leak from the upper tank 11. It is the same situation in the connecting portions between the tubes 100 and the lower tank 13.

However, in this embodiment, the introducing grooves 132 are connected to the recess 120 and most of the recess 120 is filled with the brazing material BD. Thus, the inner space of the upper tank 11 is surely prevented from fluidly communicating with the outer space through the recess 120.

In this embodiment, the introducing grooves 131 and 132 connect the recess 120 formed at the root of the rib 110 and the connecting portion between the tube 100 and the fin 200, so that the brazing material BD at the connecting portion is supplied to the recess 120. Alternatively, the tube 100 may include another recess at different part from the root of the rib 110 and the introducing grooves 131 may connect the another recess and the connecting portion between the tube 100 and the fin 200. In such configuration, the fillet FL at the connecting portion is reduced.

In this embodiment, both of the introducing grooves 131 and 132 are not connected to the connecting portion between the tube 100 and the tank.

Accordingly, a large amount of the brazing material at the connecting portion between the tube 100 and the tank is restricted from flowing to the connecting portion between the tube 100 and the fin 200 along the introducing grooves 131 and 132. Specifically, the tank described above is the upper tank 11 and the lower tank 13. Accordingly, the fillet FL formed at the connecting portion between the tube 100 and the fin 200 is surely reduced.

In this embodiment, the respective cross section of the introducing grooves 131 and 132 has a V shape shown in FIG. 5 (A) entirely. Alternatively, the shape of the cross sections of the introducing grooves 131 and 132 may be changed depending on its position. According to the inventors' knowledge from experiments, the narrower a width of the introducing grooves 131, 132 at a bottom part, the more strongly the melting brazing material BD is guided.

For example, when the cross section of the introducing groove 132 directory connected to the recess 120 has the V shape and the cross section of the introducing groove 131 directly connected to the connecting portion between the tube 100 and the fin 200 has the circular arc shape, the brazing material BD is certainly guided to the recess 120. By altering the shape of the cross section of the introducing grooves 131 and 132 depending on the position, an amount of the brazing material guided to other portions is adjusted.

Figure 7:
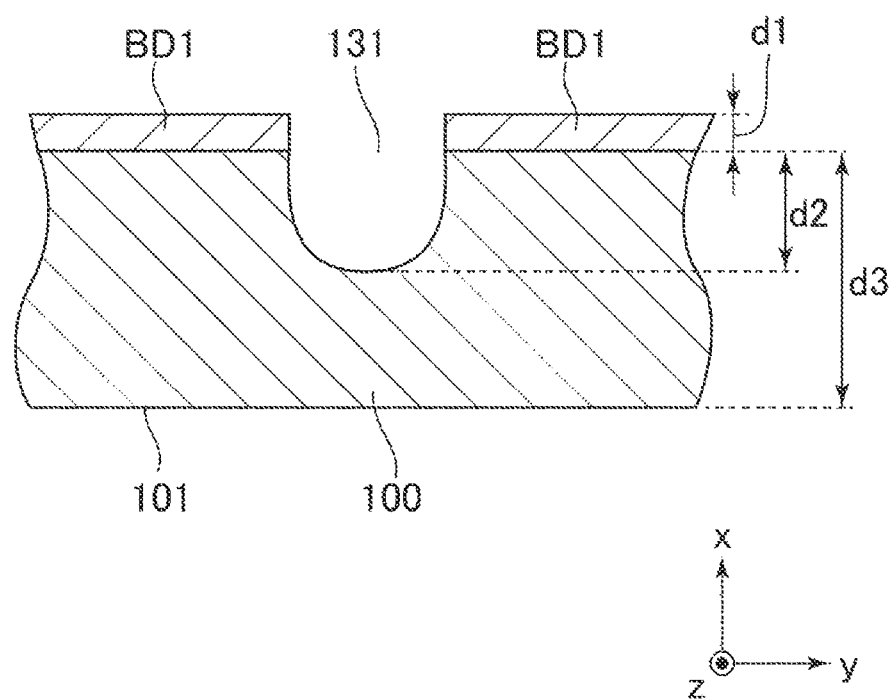
FIG. 7 is a schematic view illustrating a depth of the introducing grooves.

A depth of the introducing groove 131 will be described with reference to FIG. 7. FIG. 7 is a cross section of the metal plate forming the tube 100 that has the introducing groove 131 before being brazed. In FIG. 7, the cross section of the introducing groove 131 has a circular arc shape similarly to FIG. 5 (B).

As described above, the metal plate forming the tube 100 is a clad material. Thus, before brazing, a layer of the brazing material BD is formed to cover the entire surface of the metal plate forming the tube 100. Hereinafter, the layer of the brazing material BD is referred as a "brazing material layer BD1".

In FIG. 7, a thickness of the brazing material layer BD1 is shown as a "d1". A depth of the introducing groove 131 is shown as a "d2". A thickness of the metal plate forming the tube 100 is shown as a "d3".

When the d2 that is the depth of the introducing groove 131 is larger than the d3 that is the thickness of the metal plate, the tube 100 has a through hole. Thus, the d2 is smaller than the d3.

When the d2 that is the depth of the introducing groove 131 is the same with the d1 that is the thickness of the brazing material layer BD1, an effect to guide the brazing material in brazing is reduced. Thus, it is preferable that the d2 is larger than the d1. According to the inventors' knowledge from experiments, it is preferable that the d2 is about half of the d3.

A depth of the introducing groove 132 is set similarly to the depth of the introducing groove 131 described above. The numeral value such as d1, d2 and d3 are set in a similar manner when the introducing grooves 131 and 132 have the shapes shown in FIG. 5 (A) and FIG. 5 (C).

A second embodiment will be described with reference to FIG. 8. In this embodiment, a position of the introducing groove formed on the flat surface 101 differs from the first embodiment and other parts are similar to the first embodiment.

Figure 8:
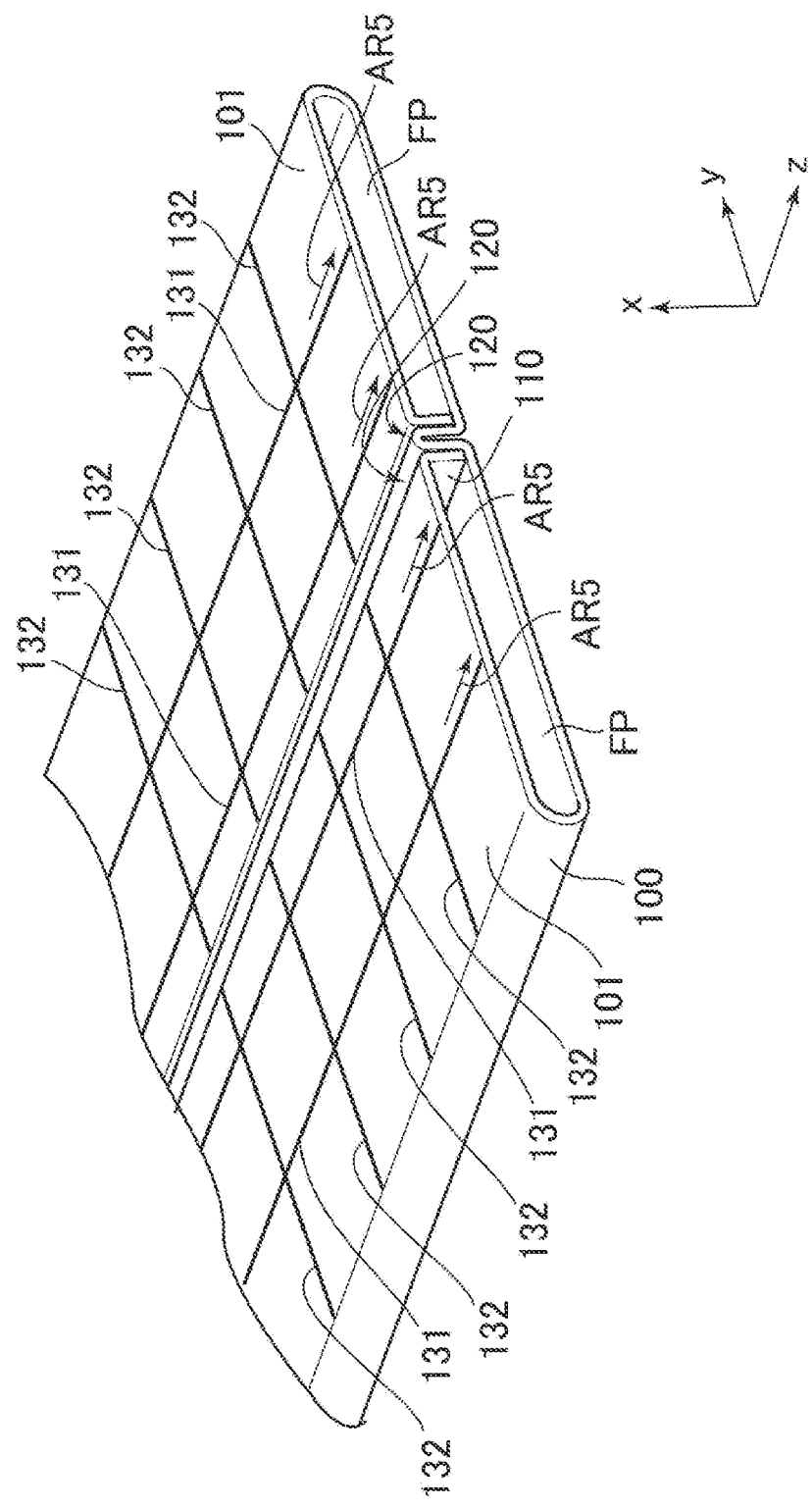
FIG. 8 is a schematic view of a tube illustrating locations of the introducing grooves on a surface of the tube in a second embodiment.

As shown in FIG. 8, in this embodiment, the introducing grooves 131 extend to the ends of the tube 100 in the longitudinal direction. Thus, the introducing grooves 131 in this embodiment are connected to the connecting portion between the tube 100 and the tank. The tank is specifically the upper tank 11 and the lower tank 13.

In this embodiment, the brazing material BD melted at brazing is guided along the introducing grooves 131 and 132. In this case, a part of the brazing material BD is guided to the ends of the tube 100 in the longitudinal direction. In FIG. 8, a flow of the brazing material BD guided in such manner is shown in arrows AR5.

In this embodiment, the connecting portion between the tube 100 and the fin 200 is connected to the connecting portions between the tube 100 and the tank with the introducing grooves 131. The tank is specifically the upper tank 11 and the lower tank 13. In this configuration, the brazing material BD at the connecting portion between the tube 100 and the fin 200 is guided to the connecting portion between the tube 100 and the tank, which reduces brazing malfunctions at the connecting portion between the tube 100 and the tank. The connecting portion between the tube 100 and the tank is so called a "root portion". In a configuration in which the amount of the brazing material BD at the root portion is insufficient, the configuration in this embodiment is effective.

In this embodiment, the amount of the brazing material BD guided to other portions can be adjusted by changing the shape of the cross section of the introducing grooves 131 and 132 depending on positions. For example, when the cross section of the introducing groove 131 directly connected to the root portion has a V shape and the cross section of the introducing groove 132 directly connected to the recess 120 has a circular arc shape, the brazing material BD is certainly guided to the root portion.

A third embodiment will be described with reference to FIG. 9. In this embodiment, a position of the introducing groove on the flat surface 101 differs from the first embodiment and other parts are similar to the first embodiment.

Figure 9:
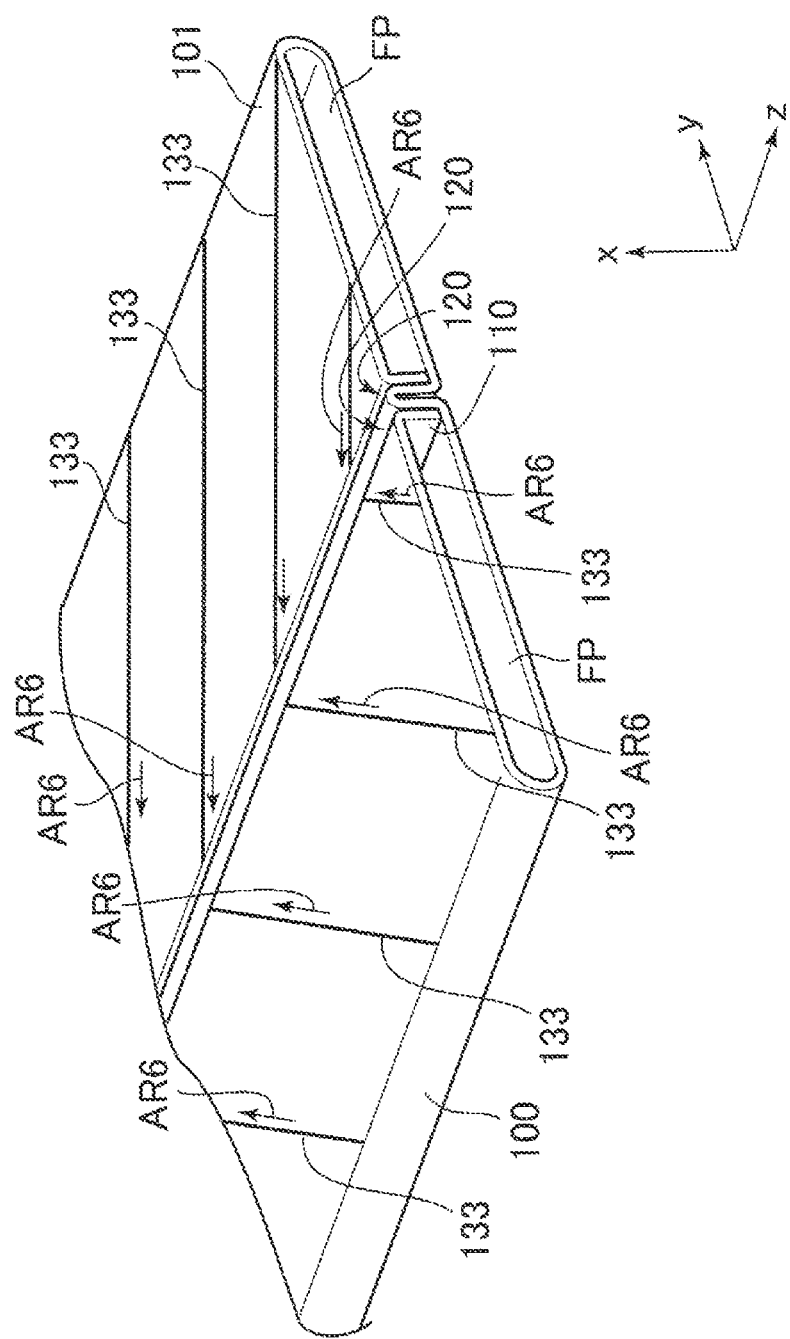
FIG. 9 is a schematic view of a tube illustrating locations of introducing grooves on a surface of the tube in a third embodiment.

As shown in FIG. 9, in this embodiment, the flat surface 101 does not include the introducing grooves 131 and 132 and includes introducing grooves 133. The introducing grooves 133 extend in a direction tilted to the y axis and the z axis and ends of the introducing grooves 133 are connected to the recess 120.

In this embodiment, the connecting portion between the tube 100 and the fin 200 are directly connected to the recess 120 with the introducing grooves 133. Thus, the brazing material BD is certainly guided from the connecting portion to the recess 120. In FIG. 9, the flow of the brazing material BD is shown in arrows AR6.

In this embodiment, the cross section of the introducing groove 133 may be a V shape shown in FIG. 5 (A), a circular arc shape in FIG. 5 (B), or a rectangular shape in FIG. 5 (C).

In this embodiment, a part of the introducing grooves 133 is connected to the connecting portion between the tube 100 and the tank. Alternatively, all of the introducing grooves 133 may be formed in the range DM in FIG. 1. The tank is specifically the upper tank 11 and the lower tank 13.

Hereinbefore, the embodiments of the present disclosure have been described with reference to concrete examples. However, the present disclosure is not limited to the concrete examples. The alternation and modification of the concrete examples are included in a range of the present disclosure as long as including technical features of the present disclosure. Elements of the concrete examples described above and positions, conditions, and shapes of the elements are not limited to those described above and can be modified appropriately. The elements of the concrete examples can be combined with each other unless technical contradictions occur.

What is claimed is:

1. A heat exchanger configured to exchange heat between a heat medium and an air, the heat exchanger comprising:
   a tube through which the heat medium flows therein, the tube having a tube shape; and
   a fin that is formed by bending a metal plate and that is brazed to a surface of the tube, wherein
   the fin includes a louver,
   the surface of the tube defines an introducing groove configured to introduce a brazing material melted at brazing from a connecting portion between the tube and the fin to an other portion,
   the surface of the tube includes a recess recessed into the tube, and
   at least a part of the introducing groove is in communication with the recess.

2. The heat exchanger according to claim 1, wherein
   the tube includes a rib formed by bending a part of a member defining a passage of the heat medium inward, and
   the recess is formed at a root of the rib.

3. The heat exchanger according to claim 1, further comprising
   a tank to which an end of the tube is connected, wherein
   the introducing groove is connected to a connecting portion between the tube and the tank.

4. The heat exchanger according to claim 1, wherein
   at least a part of the introducing groove has a rectangular shape in a cross section cut along a direction perpendicular to a longitudinal direction of the introducing groove.

5. The heat exchanger according to claim 1, wherein
   at least a part of the introducing groove has a circular arc shape in a cross section cut along a direction perpendicular to a longitudinal direction of the introducing groove.

6. The heat exchanger according claim 1, wherein
   at least a part of the introducing groove has a V shape in a cross section cut along a direction perpendicular to a longitudinal direction of the introducing groove.

7. The heat exchanger according to claim 1, wherein
   a depth of the introducing groove is less than a thickness of a metal plate configuring the tube.

8. The heat exchanger according to claim 7, wherein
   the tube is made of a clad material including a brazing layer on a surface of the clad material, and
   the depth of the introducing groove is greater than a thickness of the brazing layer.

9. The heat exchanger according to claim 1, further comprising:
   a tank to which an end of the tube is connected and the introducing groove is not connected to a connecting portion between the tube and the tank.

* * * * *